United States Patent [19]

Bergeron

[11] 3,949,997

[45] Apr. 13, 1976

[54] PISTON RING STRUCTURE

[76] Inventor: Alfred Bergeron, 1288 Bagley, Lot No. 6, Dallas, Tex. 75211

[22] Filed: Aug. 26, 1970

[21] Appl. No.: 66,991

[52] U.S. Cl. ............................... 277/221; 277/143
[51] Int. Cl.² .......................................... F16J 9/16
[58] Field of Search ........................ 277/193–197, 277/220, 221, 222, 143, 144, 145; 29/156.6, 504

[56] References Cited
UNITED STATES PATENTS

| | | | |
|---|---|---|---|
| 1,083,130 | 12/1913 | Patrick | 29/156.6 |
| 1,395,366 | 11/1921 | Schreiber | 277/197 |

OTHER PUBLICATIONS

Super–Seal, Piston Rings "The Ring of Tomorrow–Today" by Super–Seal Piston Ring Manuf. Corp. Dallas Texas —1952— pp. 8 & 9.

Sil–Fos and Easy–Flo Bulletin No. 12, copyrighted 1941 by Handy & Harman, p. 2.

*Primary Examiner*—Robert I. Smith
*Attorney, Agent, or Firm*—Peter J. Murphy

[57] ABSTRACT

A unitary spiral ring structure is fabricated from side-by-side split ring members with one end of one ring joined in overlapping relation to one end of the other ring by means of a silver soldered or other fused metal joint. The mating ends of each ring member are interlocking with the free ends being radially confined by the respective joined ends. An auxiliary expansion ring improves the sealing of the spiral ring.

3 Claims, 8 Drawing Figures

INVENTOR
Alfred Bergeron

BY

ATTORNEY

PISTON RING STRUCTURE

BACKGROUND AND SUMMARY OF THE INVENTION

This invention relates to an improved piston ring structure particularly adapted for use in high pressure engines and pumps.

This invention is an improvement of piston rings of the type described in my prior U.S. Pat. No. 2,670,255 issued Feb. 23, 1954.

An object of this invention is to provide an improved one piece piston ring fabricated of fused ring members to provide close contact with the cylinder wall.

Another object of this invention is to provide an effective piston or packing ring which can be expeditiously and economically manufactured.

A further object of this invention is to provide a one piece, spiral piston ring particularly adapted for use in ported cylinders.

Still another object of this invention is to provide a spiral type unitary piston ring wherein the free ends are appropriately confined to obviate failures in use in ported cylinders.

A still further object of this invention is to provide an improved, flexible expansion ring for use with a helical compression ring to prevent leakage of gas or liquid past the compression ring.

Another object of this invention is to provide an improved combination helical compression ring and flexible expansion ring.

These objects are accomplished in a ring structure comprising two split ring members in side-by-side relation, with one end of one ring member overlapping one end of the adjacent ring member and these ends being joined to define a unitary ring structure. More particularly, the ends are joined by a fused metal joint such as silver solder. An expansion ring, in combination, improves the sealing of the ring structure.

The novel features and the advantages of the invention, as well as additional objects thereof, will be understood more fully from the following description when read in connection with the accompanying drawings.

DRAWINGS

DESCRIPTION OF THE PREFERRED EMBODIMENT

Figure 1:
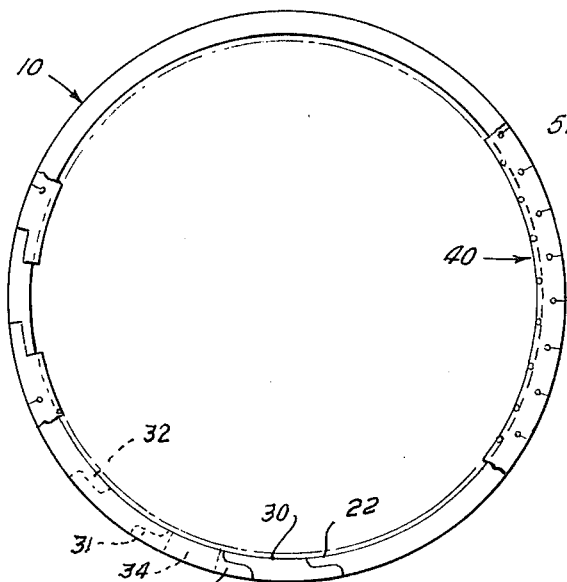
FIG. 1 is a view of a compression ring and expansion ring assembly according to the invention, from one side, with a portion of the expansion ring being broken away.

Referring to the drawings, a piston ring assembly according to the invention includes the combination of a helical compression ring structure 10 and an expansion ring member 40, with the expansion ring member being shown disposed on the top of the compression ring as viewed in the several figures of the drawing.

The compression ring 10 is a unitary assembly of split ring members disposed in side-by-side relation, including a first or upper split ring member 20 and a second or lower split ring member 30. These ring members are preferably fabricated from cast steel and may be rectangular in radial cross section.

Figure 3:
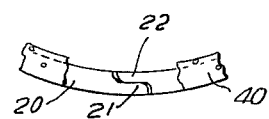
FIG. 3 is a fragmentary side view illustrating one closed joint of the compression ring.
Figure 2:
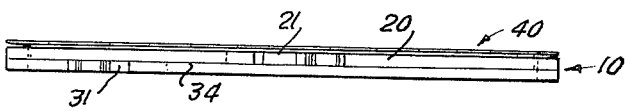
FIG. 2 is an edge view of the piston ring assembly of FIG. 1.
Figure 5:
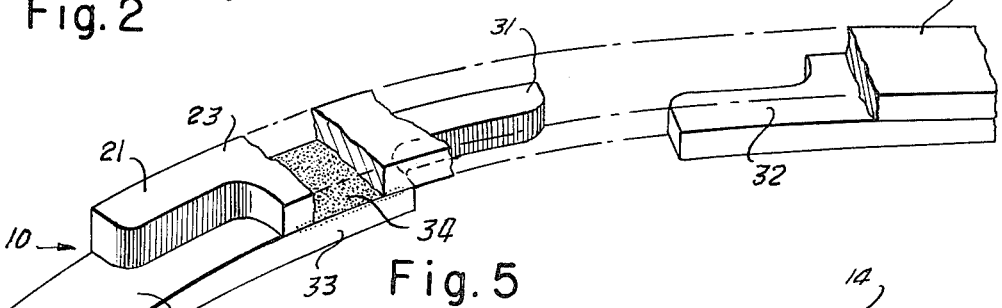
FIG. 5 is a fragmentary perspective view, partially broken away, of the compression ring illustrating the silver solder joint and the overlapping ring member joints.

The upper ring member 20 is provided with interengaging ends defined by radially spaced overlapping tongues, one tongue 21 being formed at the outer periphery of the ring member for interengagement with a tongue 22 formed at the inner periphery at the other end of the ring member. In FIGS. 1 and 5, these tongues 21 and 22 are shown in expanded condition: that is, the condition which exists when the ring assembly is not compressed and confined within a cylinder. FIG. 3 illustrates the compressed condition of this joint illustrating the overlapping condition which eliminates a direct radial passage through the ring joint to prevent radial blow-by of the gas or liquid.

The second or lower ring 30 is provided with similar radially overlapping outer and inner tongues 31 and 32, forming to prevent radial blow-by of gases or liquids in the compressed condition of the ring assembly.

To form a unitary helical compression ring 10 from the ring members 20 and 30, end portions 23 and 33 respectively of the upper and lower rings, which are the end portions adjacent to the respective outer tongues 21 and 31, are placed in overlapping side-by-side relation; and these end portions are joined together by means of fused metal joint such as a silver soldered joint 34, for example. The extent of the overlapping end portions 23 and 33, and of the area of the silver solder joint 34, are sufficiently great that the two ring members 20 and 30 are joined together as a rigid unitary assembly, thereby defining a helical ring structure of two complete turns.

While other techniques may be employed to join the ends of the ring members, such as welding or brazing, a silver soldered joint is preferred since a low melting point solder may be selected which will not require heating the joint to a temperature which will change the ring metal structure or which may distort the ring members, and yet will provide a permanent rigid joint for the operating temperatures of the engine in which the ring is used.

In assembled relation, the two joints defined in the upper and lower ring members, by the overlapping tongues, are circumferentially spaced from each other; and each joint is sealed in a longitudinal direction by the adjoining ring member to obviate longitudinal blow-by of the gas or liquid through the compression ring 10.

It is to be noted that the outer tongues 21 and 31 are disposed adjacent to the joined end portions 23 and 33 respectively, so that these outer tongues are protected by the adjoining portions of the opposite ring member. With this arrangement, the unitary helical compression ring 10 is particularly well suited for use with ported cylinders since the respective free end tongues 22 and 32 are at the inner periphery of the ring ends and retained radially inwardly of the outer tongues.

Figure 4:
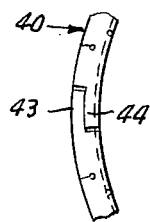
FIG. 4 is a fragmentary side view illustrating the closed joint of the expansion ring.
Figure 6:
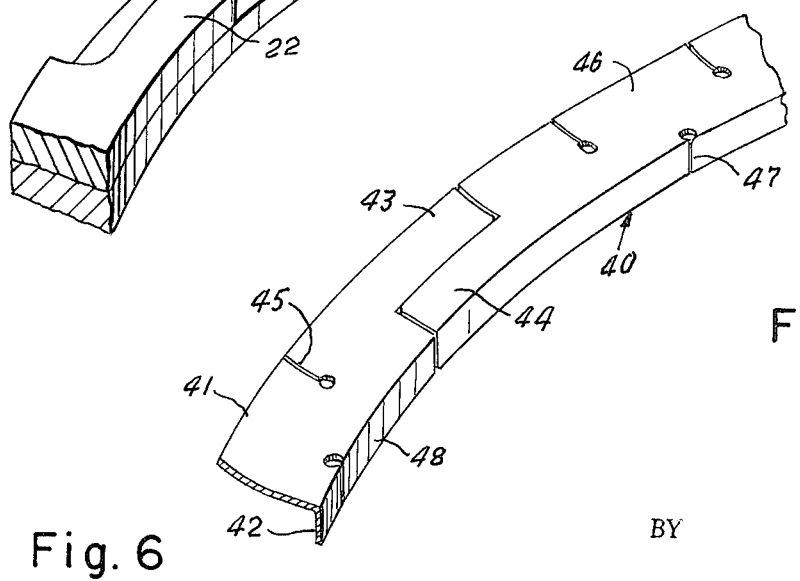
FIG. 6 is a fragmentary perspective view of the expansion ring member and joint.

The expansion ring member 40 is a split ring member, preferably fabricated of a thin sheet, spring metal and having an L-shaped cross section which is defined by a flat annular body portion 41 and an inner cylindrical flange 42. As best seen in FIGS. 4 and 6, the ends of the expansion ring are provided with outer and inner radially overlapping tongues 43 and 44.

Figure 7:
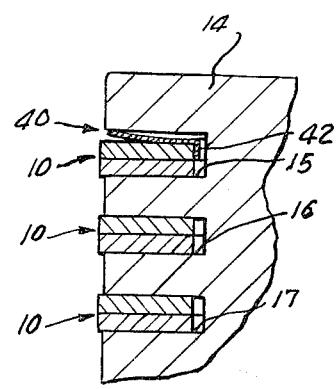
FIG. 7 is a fragmentary radial section of a piston illustrating several ring assemblies according to the invention disposed in the piston grooves.

The body portion 41 is provided with circumferentially spaced radial slots 45 extending inwardly from the outer periphery for a distance of about one-half the width of the ring, with the slots terminating in punched or drilled holes to obviate breakage. The body portion then defines radially extending spring fingers 46 which are bent upwardly, as best seen in FIG. 7, to engage the upper wall of the piston groove and urge the compression ring 10 toward the opposite or bottom wall of the piston groove and to axially compress the ring members 20 and 30. This improves the sealing of the compression ring against the bottom wall of the groove and the sealing between the ring members to obviate the flow of gas or liquid around and past the compression ring within the piston groove.

Additionally, the cylindrical flange 42 of the expansion ring is provided with circumferentially spaced slots 47 which extend from the edge of the flange into the body portion 41 to provide angularly spaced segments 48 which define the cylindrical flange. The slots 47 also terminate preferably in punched or drilled holes to obviate breakage of the ring structure at the ends of the slots. This slotted expansion ring structure is very flexible, permitting the expansion ring to expand radially into engagement with the compression ring and to urge the compression ring radially outward to conform to out-of-round conditions of the cylinder wall which may occur due to stress conditions or due to wear. This of course improves the sealing between the compression ring and the cylinder wall to thereby improve the overall performance and efficiency of the ring assembly.

In FIG. 7 as shown in fragmentary sectional view, taken in the radial plane, of a piston 14 having three ring grooves 15, 16 and 17. In the upper groove 15, there is shown a piston ring assembly according to the invention consisting of a compression ring 10 and an expansion ring 40 as above described. In the middle and lower grooves 16 and 17 there are shown only the compression rings 10 according to the invention as above described. In the assembly of the compression ring 10 and expansion ring 40 in groove 15, the parts are dimensioned such that the outer periphery of the expansion ring 40 lies within the groove to bear against the upper wall of the groove and so that it will not engage the cylinder wall.

Figure 8:
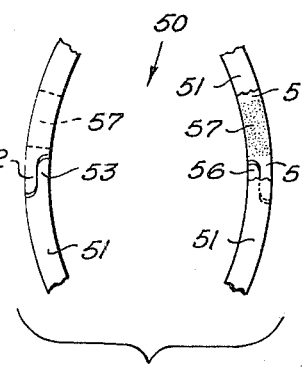
FIG. 8 is a broken view of a modified form of compression ring for use in the assembly of FIG. 1.

In FIG. 8 there is shown another form of compression ring 50 which is a unitary assembly of upper and lower split ring members 51 and 54 which may be identical to the split ring members of the compression ring 10. The compression ring 50 is adapted for use in the assembly illustrated in FIG. 1, in the same manner as is the compression ring 10.

As seen in FIG. 8, the ends of the upper ring member 51 include radially overlapping tongues 52 and 53, with the tongue 52 being formed at the outer periphery of the ring and the tongue 53 being formed at the inner periphery. Correspondingly, the ends of the lower ring member 54 include interengaging outer and inner tongues 55 and 56 respectively. In FIG. 8 the compression ring 50 is shown in the compressed condition, with slight angular clearance between the adjacent ends of each ring member.

As with the compression ring 10, the fused overlapping ends of the ring members 51 and 54 are the ends which include the outer tongues 52 and 55 respectively; and in this case the ends are overlapped to a much greater extent, the extent being approximately 180° as illustrated in FIG. 8. These overlapping ends are joined by two fused joints 57 which are preferably silver soldered joints, one fused joint being positioned closely adjacent to the end 52 of the upper ring 51 and the other fused joint being positioned closely adjacent to the end 55 of the lower ring 54. In this manner, approximately one-half of the compression ring structure which includes the ring member ends 52 and 55 is rigidly jointed together, while the ends of the ring members 53 and 56 are relatively free. As with the compression ring 10, the free ends include the radially inner fingers 53 and 56 to prevent breakage of these fingers.

As mentioned above, the ring member joints in the embodiment of FIG. 8 are disposed approximately 180° from each other. It will be apparent that the extent of overlap may be varied between the small overlap illustrated by the ring 10 and the relatively large overlap illustrated by the ring 50. It will also be apparent that additional fused joints 57 may be provided to join the overlapping end portions of the ring members.

What has been described is an improved compression ring structure comprising a unitary helical ring of two turns fabricated from adjoining split ring members fabricated together in an integral assembly, and which is particularly adapted for use with a ported cylinder. Also described is such a compression ring in combination with an improved flexible expansion ring for urging the compression ring radially against the cylinder walls and for urging the compression ring axially or longitudinally against one wall of the piston groove to improve sealing and to obviate hammering of the compression assembly between the groove walls.

While preferred embodiments of the invention have been illustrated and described, it will be understood by those skilled in the art that changes and modifications may be resorted to without departing from the spirit and scope of the invention.

What is claimed is:

1. A piston ring structure comprising
   first and second split ring members, each of said members being a flat member having a uniform generally rectangular cross-section; the confronting ends of each ring member including radially interengaging tongues defining a sealed joint to prevent radial blowby, one end of each ring member including an outer tongue defining a part of the outer peripheral wall thereof;
   said first and second ring members being disposed in contiguous side-by-side relation with said one ends being disposed in overlapping angularly spaced relation; and silver solder joint means joining said one ends of said first and second members to define a rigid assembly of said members; said silver solder joint means being disposed immediately adjacent to each of said outer tongues to prevent movement of said outer tongues relative to the respective adjacent ring member; and the other end of each ring member, including an inner tongue, being radially confined by its respective outer tongue;

said one ends of said first and second ring members being angularly overlapped through a substantial angle; and said silver solder joint means including a first silver solder joint disposed immediately adjacent to the outer tongue of said first ring member, and a second silver solder joint disposed immediately adjacent to the outer tongue of said second ring member.

2. A piston ring structure as set forth in claim 1 said one ends of said ring members being overlapped about 180°.

3. A piston ring structure as set forth in claim 1 including an expansion ring member for urging said compression ring members together and against the cylinder walls;

said expansion ring member being radially slotted to define radial spring fingers acting on a piston groove wall to urge the compression ring members together and toward the opposite wall of the piston groove;

said expansion ring member including a cylindrical flange for engagement with the inner cylindrical wall of the compression ring assembly; and said flange being slotted to define circumferentially spaced segments for engagement with the inner cylindrical wall of the compression ring assembly.

* * * * *